United States Patent Office 3,843,355
Patented Oct. 22, 1974

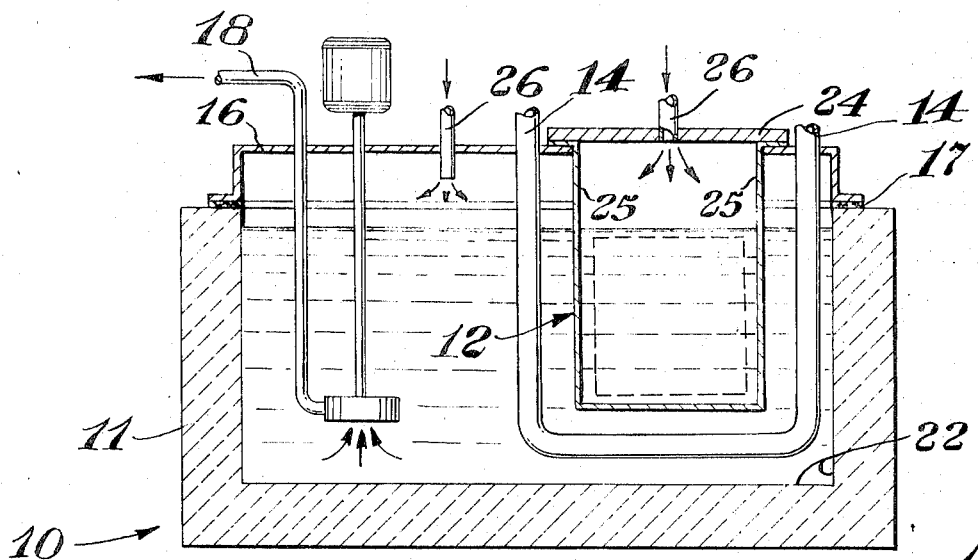
Fig. 1
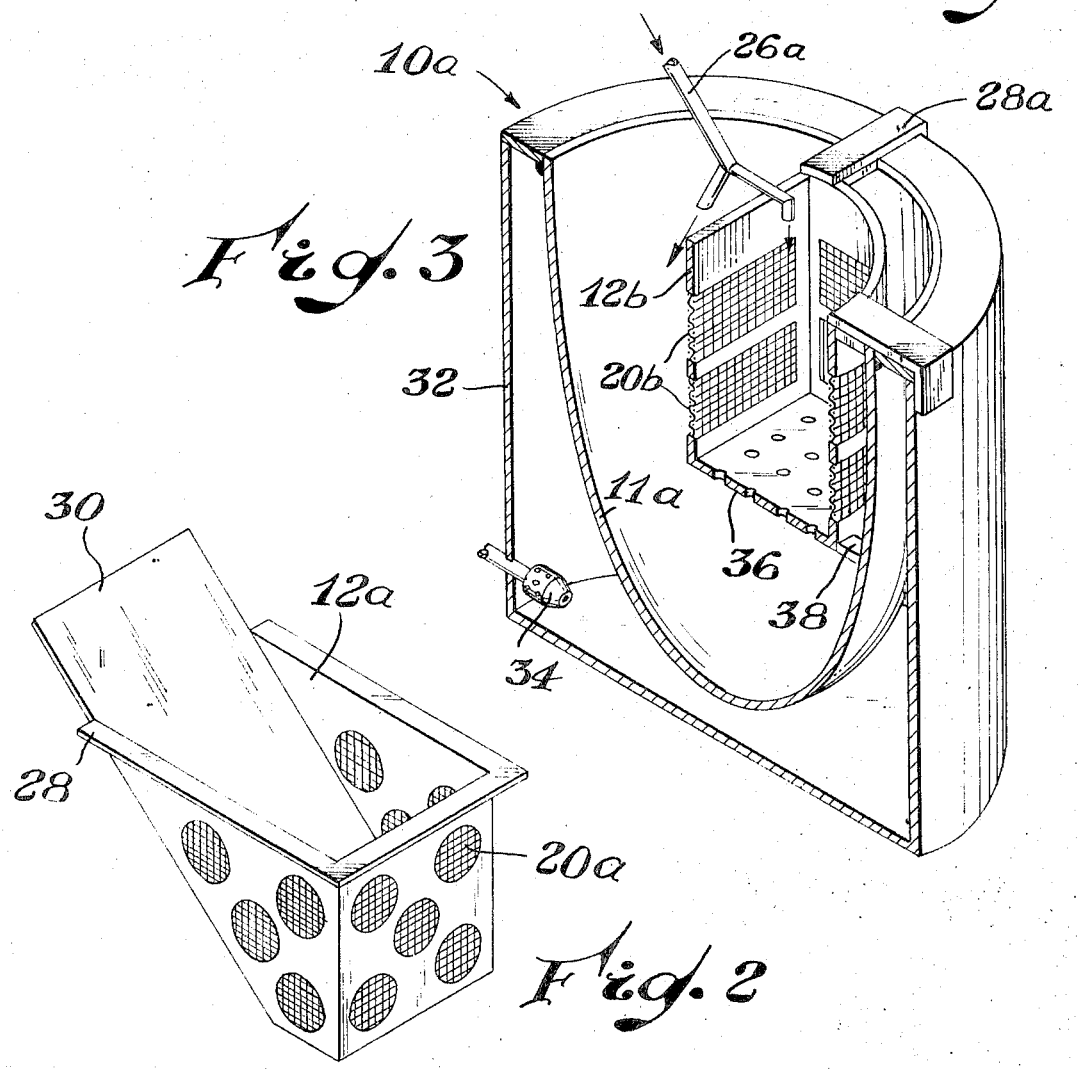
Fig. 3
Fig. 2

3,843,355
METHOD FOR MELTING AND PURIFYING MAGNESIUM
John N. Reding, Midland, Mich., assignor to The Dow Chemical Company, Midland, Mich.
Filed Apr. 4, 1972, Ser. No. 240,933
Int. Cl. C22b 45/00
U.S. Cl. 75—67                  33 Claims

ABSTRACT OF THE DISCLOSURE

An apparatus and method for melting magnesium without a salt type flux. Solid magnesium is charged into and melted within a gas atmosphere protected melting means. Substantially inclusion free molten metal flows through holes in the melting means into a holding means where it is removed by common techniques. A selected protective gas prevents oxidation of the magnesium.

BACKGROUND OF THE INVENTION

This invention relates to the melting of magnesium and magnesum alloys and more in particular pertains to the melting of magnesium in the absence of a salt flux.

Heretofore magnesium has generally been melted in the presence of a salt type flux to minimize oxidation of the magnesium at elevated temperatures. Generally a salt flux has been mixed with molten magnesium to minimize nonmetallic inclusions in the metal and achieve a satisfactory recovery of magnesium from solid magnesium scrap. This technique usually required a settling time period to physically separate the flux and the metal.

In spite of the fact that a salt flux improves the magnesium recovery, such as flux is oftentimes undesirable since it presents a heat transfer barrier, is corrosive to the surrounding equipment, and can combine with impurities in the molten melt or moisture in the atmosphere to form a sludge-like residue in the lower section of the molten metal holding hearth or crucible. Upon removal of the sludge, magnesium can become entrapped therein and be discarded unless a subsequent recovery procedure is employed. It is desirable that suitable equipment and methods be provided to melt magnesium without requiring a salt flux.

SUMMARY OF THE INVENTION

An apparatus has been developed for melting magnesium and magnesium alloys with greater than about 50% magnesium therein without requiring a salt flux cover on the magnesium surface. Hereinafter the term "magnesium" is defined to include such magnesium alloys. The described apparatus comprises a holding means suitable to contain molten magnesium at the temperatures to which the metal is heated and a means for melting solid magnesium in combination with the holding means. The melting means has a wall portion defining a hole therethrough. The hole extends to the holding means and is of a sufficient size to pass molten metal from the melting means to the holding means. Preferably the hole is also of sufficient size to simultaneously retain undesired nonmetallic contaminates in the melting means. Oxides, and other contaminates within the magnesium usually rise to the molten-atmosphere surface within the melting means and are excluded from the holding means by a wall portion of the melting means.

A heating means is adapted to supply sufficient heat to melt the solid magnesium within the melting means. The heating means supplies adequate heat to both melt the solid magnesium and to simultaneously maintain the melted magnesium at a desired temperature for subsequent use; for example, die, ingot, permanent mold or sand casting. The magnesium melting apparatus or furnace additionally has at least one inlet means adapted to provide a protective gas to both the holding means and the melting means.

Magnesium scrap or ingot is melted in the salt flux free, gas protected melting means and passed or flowed through holes in wall portions of the melting means into the adjacent holding means. Nonmetallic contaminates are retained within the melting means. Removal of the molten metal from the holding means is carried out in accord with well known procedures.

The described apparatus and method are especially suited to melt magnesium casting scrap. The metal removed from the holding means has surprisingly been found to be commercially free of nonmetallic contaminates; i.e., the metal is suitable for production of commercial castings.

DESCRIPTION OF THE DRAWING

The accompanying drawing further illustrates the invention:

In FIG. 1 is depicted an embodiment of the invention with a melting means disposed within a holding means;

FIG. 2 is an isometric view of one embodiment of the melting means; and

FIG. 3 is a cross-sectioned isometric view of another embodiment of the invention.

Identical numerals, distinguished by a letter suffix, within the several figures represent parts having a similar function within the different embodiments.

DESCRIPTION OF THE PREFERRED EMBODIMENTS

A magnesium melting apparatus 10 of FIG. 1 is comprised of a molten magnesium holding means 11, a melting means 12, at least one heating means 14, a melt enclosing cover member 16, and a molten metal removal means 18.

The holding means 11 is constructed of a material, such as steel or a refractory material or brick, suitable to contain molten magnesium at the temperatures generally employed in magnesium casting processes. Such processes include sand, permanent mold and preferably die casting.

The melting means 12 is a partially enclosed container adapted to pass molten magnesium through pores or holes in wall portions thereof of and to simultaneously retain magnesium contaminating substances within the container. Such contaminating substances or inclusions include nonmetallics such as oxides, nitrides, and carbonaceous films; ferrous metals such as steel and iron; and the like. The holes defined by the wall portions of the melting means 12 are preferably of a suitable size and configuration to remove substantially all of the undesirable contaminating inclusions from the molten magnesium flowing into the holding means 11; however, the term "hole" includes a substantially larger opening with a porous filter media enclosing substantially the entire cross-sectional area of the opening in the melting means 12. Preferably the filter media, such as a screen (not shown), has openings therein of sufficient size to pass thorugh molten magnesium and exclude solid particles larger than about 0.05 inches in diameter. Floating contaminates or dross is retained within the melting means 12 by a solid wall portion 25 positioned to at least partially extend below the molten magnesium-dross interface.

The melting means 12 is preferably, but not necessarily, positioned within the holding means 11 and spaced apart from adjacent floor and wall portions 22 of the holding means 11. Such spaced apart relationship provides an improved heat transfer capability and a consequent increase in the magnesium melting rate.

The heating means 14 is suitable to melt magnesium scrap castings at a predetermined desired rate. The heating means 14 can be gas or oil fired burners, electric heating elements, immersion heaters and the like. In the present melting furnace or apparatus 10 the heaters can be positioned to impart heat on the exterior of the holding means 11 and the melting means 12, as was common in the prior art wherein a heat insulating, protective salt flux covered the magnesium-atmosphere interface. For optimum heat transfer, it is preferred that the heating means 14 of the apparatus 10 be positioned within the molten magnesium melt and adjacent to the melting means 14.

The melt enclosing cover member 16 is adapted to be cooperatively, detachably positioned above at least the holding means 11 and preferably also the melting means 12 to retain a protective gas within a space formed between an inner surface of the cover 16 and the magnesium melt surface. The cover 16 preferably has a removable surface portion 24 located generally above the melting means 12 to afford convenient access to charge metal or remove floating or settled contaminates from the melting means 12. A heat resistant seal 17, such as asbestos, can, optionally, be positioned between the cover 16 and holding means 11 to retard loss of the protective gas from within the apparatus 10. Wall portions 25 of the melting means are desirably adapted to separate the protective gas within the melting means from the atmosphere within the holding means 11. Such a configuration conserves the gas and minimizes disturbance of metal within the holding means 11 during removal of the dross from the melting means.

The protective gas is supplied to the apparatus 10 through at least one protective gas inlet means; for example, tubes or pipes 26. The pipes 26 can be in any convenient location to supply an adequate quantity of protective gas to the apparatus 10 to minimize oxidation or burning of the magnesium.

The metal removal means 18 is suitable to withdraw molten magnesium from the holding means 11 at a desired rate. The configuration of the metal removal means 18 is not critical and can be, for example, a centrifugal pump such as those well known in the casting art, a pluggable hole in a wall portion of the holding means 11 suited to pass molten magnesium therethrough or a ladle capable of transferring molten magnesium from the holding means 11 to a casting die or mold (not shown).

A conveyor-type device (not shown) can be cooperatively combined with the apparatus 10 to continuously supply magnesium to the melting means 12. Such a combination can be employed for the melting of magnesium at locations adjacent to casting equipment and maintained by fewer people than heretofore necessary for melting and holding furnaces requiring a salt flux.

In FIG. 2 there is illustrated an isometric view of a melting means 12a with a plurality of holes extending through the wall portions thereof. The holes are enclosed or covered by, for example, an iron or steel grate or screen 20a. An outwardly extending flange 28 provides a supporting surface to properly align and support the melting means 12a within a holding means (not shown). An inclined or sloping surface 30 of the melting means 12a can be provided to facilitate addition or charging of magnesium scrap into the melting means.

A holding means or crucible 11a of FIG. 3 is spaced apart from a heating means including a heat enclosure 32 and heat source 34. A melting means 12b is detachably positioned between and in a spaced apart relationship with inner wall portions of the holding means 11a. The melting means 12b is substantially insoluble in molten magnesium. Rectangularly shaped openings, enclosed by preferred magnesium wetted screens 20b, extending through generally vertical side wall sections and a perforated bottom section 36 afford egress of molten magnesium from the melting means 12b. At least one protective gas supply means 26a provides a suitable gas to the apparatus 10a to minimize or prevent oxidation of the heated or molten magnesium. A flange 28a supports the melting means 12b and a lower flange 38 spaces the side walls of the melting means 12b apart from the inner walls of the crucible 11a. A cover (not shown) to retain the protective gas in contact with substantially the entire magnesium surface is optionally, and preferably, detachably positioned above the holding crucible 11a and the melting means 12b.

During operation of the embodiment of FIG. 1 magnesium ingot or scrap from processes such as permanent mold, sand and preferably die casting are provided or fed to the melting means 12 and melted by application of heat either directly to the solid scrap or indirectly by conduction and convection through molten magnesium in the holding means 11. The melted or liquid magnesium passes through the screen 20 into the holding means 11.

An effective amount of a gas such as argon, carbon dioxide, nitrogen, sulfur hexafluoride, boron tetrafluoride and sulfur dioxide is supplied through the pipes 26 to substantially entirely cover the magnesium melt and prevent substantial reaction between the metal and ambient atmosphere. Preferably the gas forms a protective film on the magnesium surface. Such film former gases are for example carbon dioxide, nitrogen, and sulfur hexafluoride. More preferably, a mixture of the film former gas and air is employed. Even more preferably a mixture of about 0.01 to aboue one volume percent sulfur hexafluoride and air is employed.

The magnesium melt is removed from the holding means 11 by the pump 18. Preferably, such metal removal is carried out in a manner adapted to minimize disturbance of the metal surface and breaking of the protective film.

The embodiment of FIG. 3 is operated substantially as described for FIG. 1.

Metal processed in the described manner is substantially free of nonmetallic, contaminating particles; that is, the metal is usable for producing commercial castings without further refining. In the described process a majority of the oxides and nonmetallics released from the melted scrap rise to and float on the molten magnesium surface rather than accumulating on the bottom of the hearth as typical with salt flux melting methods. Heavy, settled materials can occasionally be readily removed from the bottom of the melting means by common means. Floating dross can be skimmed and removed from the metal surface within the melting means without disrupting the continuous protective film covering the surface of the metal within the holding means.

The following examples are illustrative of the described magnesium melting process.

Example 1

Scrap was melted in a salt flux free environment empolying an apparatus substantially as shown in FIG. 1 with a peforated melting means bottom section and a heating means adapted to apply heat to the exterior of the holding means or crucible instead of the depicted immersion heater. Die cast magnesium scrap containing a nominal 9 weight percent aluminum, 0.15 weight percent manganese and 0.7 weight percent zinc was charged into the screen enclosed melting means. The scrap had been produced during die casting using an organic base lubricant in the "shotwell." Upon melting, the magnesium flowed into the molten melt maintained in the crucible at a temperature of about 1300° F. Accumulated floating dross and sludge was removed from the melting means during operation. The molten magnesium was withdrawn from the crucible by a centrifugal type pump. A protective gas was maintained in the apparatus at all times during melting. The results of the above test, as shown in Table I indicate that satisfactory metal was produced with a low metal loss.

Examples 2 and 3

Magnesium ingot cast from metal produced as described in Example 1 was recycled and melted substantially as described in Example 1 using the protective atmospheres shown in Table I. Satisfactory metal was produced.

Example 4

Molten magnesium of a satisfactory quality was produced at a low metal loss in a manner substantially as described for Examples 2 and 3 using a solid melting means bottom section. The test results are shown in Table I.

TABLE I

| | Protective gas | | Metal charged (lbs.) | Dross produced (weight percent) | Metal loss (wieght percent) | |
|---|---|---|---|---|---|---|
| | | | | | Without metal recovery processing | With metal recovery reprocessing |
| Example | Volume percent | Flow rate (lbs./hr.) | | | | |
| 1 | 99 air 1 SF$_6$ | 0.08 SF$_6$ | 1,007 | 1.6 | 2.4 | 1.5 |
| 2 | 99.9 air, 0.1 SF$_6$ | 0.08 SF$_6$ | 1,282 | 1.6 | 2.2 | 1.1 |
| 3 | {100 CO$_2$ in holding means<br>9 and<br>99 air, I SF$_6$ in melting means | 1.4 CO$_2$<br>0.03 SF$_6$} | 1,169 | 2.1 | 2.5 | 1.5 |
| 4 | 9.9 air, 0.1 SF$_6$ | 0.03 SF$_6$ | 1,309 | 1.2 | 1.2 | 0.05 |

What is claimed is:

1. A method comprising sequentially melting magnesium having nonmetallic contaminants in a salt flux free, protective gas atmosphere, melting means with wall portions defining at least one hole therethrough, the hole being of sufficient size and configuration to retain nonmetallic contaminants within the melting means; flowing the molten magnesium through the hole from the melting means into an adjacent holding means and retaining nonmetallic contaminants within the melting means; and removing the molten magnesium from the holding means.

2. The method of Claim 1 wherein the metal removed from the holding means is commercially free of nonmetallic contaminants.

3. The method of Claim 1 wherein the melting is carried out with die casting scrap.

4. The method of Claim 1 wherein the melting is carried out using a heating means positioned within the molten magnesium melt.

5. The method of Claim 1 including the additional step of supplying sufficient protective gas to the melting means and the holding means to minimize oxidation of the magnesium.

6. The method of Claim 1 including continuously supplying magnesium to the melting means and melting solid magnesium scrap.

7. The method of Claim 1 wherein the molten magnesium is removed by means of a pump.

8. The method of Claim 1 wherein the hole is enclosed by a screen.

9. The method of Claim 1 including the additional step of positioning a melting means within the holding means before the melting step.

10. The method of Claim 1 wherein the metal removal is carried out in a manner adapted to minimize disturbance of the molten metal surface.

11. The method of Claim 1 wherein the melting is carried out in a film forming protective gas atmosphere.

12. The method of Claim 1 wherein the molten metal is passed through a plurality of holes in wall portions of the melting means.

13. The method of Claim 1 wherein floating contaminants are retained within the melting means by a wall portion of the melting means.

14. The method of Claim 13 including maintaining the molten magnesium-dross interface above the hole in the melting means.

15. The method of Claim 1 wherein the hole is substantially enclosed by a porous filter media.

16. The method of Claim 15 wherein the molten magnesium flows through openings in the porous filter media of a sufficient size to exclude solid particles larger than about 0.05 inch in diameter.

17. The method of Claim 16 including providing sufficient protective gas selected from the group consisting of carbon dioxide, nitrogen and sulfur hexafluoride to substantially entirely cover the molten magnesium and thereby produce molten magnesium with a metal loss during melting of less than 2.5 weight percent of the solid magnesium melted.

18. The method of Claim 1 including providing a protective gas selected from the group consisting of argon, carbon dioxide, nitrogen, sulfur hexafluoride, boron tetrafluoride, and sulfur dioxide to the melting means and the holding means.

19. The method of Claim 18 wherein the protective gas is sulfur hexafluoride.

20. The method of Claim 19 including providing a mixture of the protective gas and air.

21. The method of Claim 20 wherein the mixture provided contains about 0.01 to about 1 volume percent sulfur hexafluoride.

22. A method to melt magnesium in a salt flux free environment comprising providing solid magnesium scrap having nonmetallic contaminants to a salt flux free melting means with at least one hole extending through wall portions thereof to a molten metal holding means, the melting means disposed within the holding means, the hole being of sufficient size and configuration to retain nonmetallic contaminants within the melting means;

introducing a protective gas into the melting means and holding means to minimize oxidation of the magnesium;

heating the scrap in the melting means with the protective gas therein sufficiently to melt the magnesium whereby molten magnesium flows through the hole into the holding means and nonmetallic contaminates remain within the melting means; and removing the molten magnesium from the holding means.

23. The method of Claim 22 wherein the metal removed from the holding means is commercially free of nonmetallic contaminates.

24. The method of Claim 22 wherein a film forming gas is introduced.

25. The method of Claim 22 wherein the gas is selected from the group consisting of carbon dioxide, nitrogen and sulfur hexafluoride.

26. The method of Claim 22 including flowing the molten magnesium through a plurality of holes in wall portions of the melting means.

27. The method of Claim 22 wherein the hole is enclosed by a screen.

28. The method of Claim 22 wherein the melting is carried out with die casting scrap.

29. The method of Claim 22 wherein the protective gas is a mixture of sulfur hexafluoride and air.

30. The method of Claim 22 wherein the hole is substantially enclosed by a porous filter media.

31. The method of Claim 30 wherein the molten magnesium flows through openings in the porous filter media of a sufficient size to exclude solid particles larger than about 0.05 inch in diameter.

32. The method of Claim 22 wherein floating contaminants are retained within the melting means by a wall portion of the melting means.

33. The method of Claim 32 including maintaining the molten magnesium-dross interface above the hole in the melting means.

References Cited

UNITED STATES PATENTS

| | | | |
|---|---|---|---|
| 3,043,895 | 7/1962 | Rohn | 266—33 RX |
| 2,621,916 | 12/1952 | Murphy | 266—37 |
| 2,015,111 | 9/1935 | Jacobson | 266—33 R |
| 2,077,990 | 4/1937 | Day | 75—67 A |
| 3,634,066 | 1/1972 | Matthews et al. | 75—67 X |
| 1,552,865 | 9/1925 | Metzger | 75—67 A |
| 1,710,398 | 4/1929 | Bakken | 75—67 A |
| 1,898,969 | 2/1933 | Barstow | 75—96 |
| 3,400,752 | 9/1968 | Unsworth | 75—96 X |

FOREIGN PATENTS

| | | | |
|---|---|---|---|
| 1,148,344 | 4/1969 | Great Britain | 75—68 R |
| 578,977 | 7/1946 | Great Britain | 75—67 A |

OTHER REFERENCES

Nelson: Trans. of Amer. Foundrymen's Soc., vol. 56, p. 9, 1948.

L. DEWAYNE RUTLEDGE, Primary Examiner

M. J. ANDREWS, Assistant Examiner

U.S. Cl. X.R.

75—65R, 96; 266—33S

PO-1050
(5/69)

UNITED STATES PATENT OFFICE
CERTIFICATE OF CORRECTION

Patent No. 3,843,355      Dated October 22, 1974

Inventor(s) John N. Reding

It is certified that error appears in the above-identified patent and that said Letters Patent are hereby corrected as shown below:

Column 1, line 63, after "molten" insert --metal--

Column 4, line 30, delete "aboue" and insert --about--.

Column 5, Table I, Example 3, under "Volume percent", delete "9".

Column 5, Table I, Example 4, under "Volume percent", delete "9.9" and insert --99.9--.

Signed and sealed this 11th day of February 1975.

(SEAL)
Attest:

RUTH C. MASON
Attesting Officer

C. MARSHALL DANN
Commissioner of Patents
and Trademarks